United States Patent [19]

Bischoff et al.

[11] Patent Number: 4,535,957
[45] Date of Patent: Aug. 20, 1985

[54] SAFETY DEVICE FOR VENTING AIRCRAFT TIRES

[75] Inventors: Andrea L. Bischoff; Robert W. Chin, both of Akron, Ohio

[73] Assignee: Goodyear Aerospace Corporation, Akron, Ohio

[21] Appl. No.: 514,737

[22] Filed: Jul. 18, 1983

[51] Int. Cl.$^3$ .............................................. B64C 25/00
[52] U.S. Cl. ................................. 244/103 R; 137/70; 152/415; 301/5 VH
[58] Field of Search .................. 244/100 R, 103 R; 137/70, 72, 73, 74; 220/89 B; 301/5 R, 5 VH; 152/330 R, 330 C, 415, 427

[56] References Cited

U.S. PATENT DOCUMENTS

| | | | |
|---|---|---|---|
| 1,796,200 | 3/1931 | Grieshaber | 137/70 |
| 2,461,940 | 2/1949 | Sundstrom | 220/89 B |
| 3,254,666 | 6/1966 | Baker, Jr. | 152/415 |
| 3,618,627 | 11/1971 | Wagner | 137/73 |
| 3,645,479 | 2/1972 | Kostroun | 244/103 R |
| 3,730,205 | 5/1973 | Guimbellof | 137/73 |
| 4,314,596 | 2/1982 | Keresztes | 244/103 R |
| 4,365,643 | 12/1982 | Masclet et al. | 244/103 R |

Primary Examiner—Galen L. Barefoot
Attorney, Agent, or Firm—P. E. Milliken; L. A. Germain

[57] ABSTRACT

A device (10) for venting aircraft tires comprises a fusible plug (42) and a spring-biased piston (30), both plug (42) and piston (30) being positioned within a single bore (B) of the device. The plug (42) is meltable out of the bore when the wheel (12) temperature increases above a specific limit set by the eutectic material which frees the piston (30) to move out of a spring-biased and bore-sealing position within a sealing ring (22) by an overpressure within the tire which overcomes the spring bias. The piston (30) will return to a sealing position when the pressure drops below a value which is insufficient to overcome the spring bias.

5 Claims, 3 Drawing Figures

SAFETY DEVICE FOR VENTING AIRCRAFT TIRES

BACKGROUND OF THE INVENTION

This invention generally relates to safety devices for aircraft landing gear and more particularly to a temperature and pressure sensitive valve assembly that prevents tire blowout due to overpressure generated by heat buildup during high energy braking situations.

Fusible plugs have been used for some years in aircraft wheel and tire assemblies as precautionary devices when excessive temperatures are generated in the assembly during high energy braking. The plugs contain a eutectic material that is designed to melt at a temperature below the safe temperature limit of the particular type of tire. When the specific melt temperature is reached, the fusible plug softens and/or melts to the extent that it is blown out by reason of increased tire pressure thus venting the tire and preventing tire blowout and/or explosion.

Devices of this type are taught and illustrated in the following prior art patents: U.S. Pat. No. Re. 26,137 (G. E. Stanton); U.S. Pat. No. 2,001,686 (R. H. Moore, et al); U.S. Pat. No. 3,138,406 (R. K. Chamberlain); U.S. Pat. No. 3,269,402 (R. F. Horner); U.S. Pat. No. 3,517,683 (H. R. Chandler); U.S. Pat. No. 3,559,668 (R. L. Crossman); U.S. Pat. No. 3,991,804 (M. E. Wilson); U.S. Pat. No. 4,365,643 (Masclet, et al); and British No. 782,559 (Bendix Corp.).

While these prior art devices work in their intended applications, they are not practical for use on modern aircraft which travel at greater speeds and carry increasingly heavier loads. The reason for this is the fact that all of these prior art devices are intended to blow the fuse plug at a particular temperature limit whereupon complete deflation of the associated tire results. In this circumstance, a deflated tire operating at high speed will result in heat buildup in the tire carcass and ultimate total destruction by explosion of the tire. Furthermore, it has been shown that when one tire of a pair on a landing gear strut is deflated, the opposite tire bears the increased load which may result in its destruction also. In any event and in a situation of an aircraft operating at high speed with a deflated tire, the result is extremely hazardous and may be catastrophic to the aircraft. Therefore, the fusible plugs of the prior art, while saving the particular tire experiencing overpressure due to heat buildup, are not the ultimate answer to the tire deflation problem and the hazard which such creates for a high speed and heavily loaded aircraft.

Accordingly, the present invention provides a solution to the problem by providing a fusible plug and valve assembly that protects a tire from overpressure by venting off the overpressure at a particular temperature limit but also maintains a minimum safe tire pressure. This allows the tire to continue to be operational and bear its share of the load until the aircraft is safely stopped.

SUMMARY OF THE INVENTION

The above-stated advantages of the invention are provided in a device for venting aircraft tires comprising a fusible plug and a spring biased piston, both plug and piston being positioned within a single bore of the device. The plug is meltable out of the bore when the wheel temperature increases above a specific limit set by the eutectic material which frees the piston to move out of a spring biased and bore sealing position within a sealing ring by an overpressure within the tire which overcomes the spring bias. The piston, however, closes to a sealing position again when the pressure drops below a value insufficient to overcome the spring bias.

DETAILED DESCRIPTION OF THE INVENTION

Figure 1:
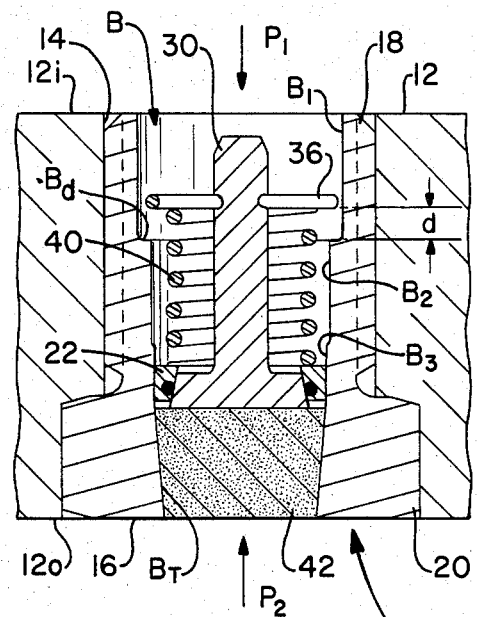
FIG. 1 is a sectional elevational view of a tire safety device according to this invention showing the device in its operational condition at normal temperature and pressure.

Referring to the drawings in the several figures wherein like reference numerals designate the same parts and/or elements, a fused valve plug in accordance with this invention is generally indicated by reference numeral 10 as it may be mounted in an aircraft wheel 12. The inside of the wheel 12, that is the portion which carries the tire beads (not shown), is indicated by reference numeral 12$i$ while the outside is indicated by reference numeral 12$o$. Accordingly, a tire pressure $P_1$ exists within the wheel/tire assembly and a pressure $P_2$ exists outside of the assembly and under normal operating conditions as illustrated in FIG. 1 of the drawing $P_1 > P_2$.

The fused valve plug 10 comprises a cylindrical housing 16 that is received within a bore 14 of the wheel 12. Retention of the housing 16 within the bore 14 may be accomplished by various means including screw threads 18 as illustrated. The housing 16 is flush mounted within the wheel 12 and a flanged end 20 limits its extent within the bore 14. Alternatively, the housing 16 may extend outside of the bore 14 and in this case the flange 20 will abut the outside surface 12$o$ of the wheel 12.

The housing 16 is characterized by an axial bore B having an inner and first bore portion $B_1$ that terminates within the housing at a second bore portion $B_2$ of a slightly lesser diameter. Thus, a bore differential or step $B_d$ exists as between $B_1$ and $B_2$. The second bore portion $B_2$ extends through the intermediate portion of the bore B and terminates at a third bore portion $B_3$ of a slightly lesser diameter than bore portion $B_2$. The bore portion $B_3$ is of a very short axial length as compared to either of bore portions $B_1$ and $B_2$ and it terminates at a tapered bore portion $B_T$ which extends through the remaining length of the housing 16.

A valve assembly is axially positioned within the bore B of the housing 16 and this comprises a seal ring 22, a piston 30, and a spring 40. The seal ring 22 is an annular ring having an outside diameter such that it is force-fit into the third bore portion $B_3$ and it is further characterized by a tapered bore 22$a$ having an O-ring seal 24 mounted within a groove in the bore 22$a$ in a conventional manner. The piston 30 has a head end 32 and a stem end 34, the head end 32 being positioned toward the outside 12$o$ with respect to the seal ring 22. The head end 32 has a tapered peripheral edge 32$a$ that is complimentary to the tapered bore 22$a$ of the seal ring 22 such that a valve seal is effected between the two and the O-ring assures such sealing relationship. The stem end 34 of the piston protrudes inwardly and axially through bore portions $B_2$ and $B_1$ respectively and carries a washer 36 at the inward end of the stem in a groove 38. The washer 36 has a diameter less than the diameter of the bore $B_1$ but greater than the diameter of bore portion $B_2$ such that it moves readily in the axial direction within bore portion $B_1$ but is stopped from entering bore portion $B_2$ by the difference in the diameters of the bores at $B_d$.

Now therefore, the spring 40 is mounted about the piston stem 34 and it has a diameter such that it abuts the washer 36 at one end and abuts the seal ring 22 at the opposite end. In this circumstance, it will be recognized that the piston 30 is biased in a closed-valve position by the spring force such that the tapered peripheral edge of the piston head is sealed within the bore 22a of the seal ring 22 and such seal is assured by the O-ring 24.

Finally and to complete the valve plug assembly, a eutectic material plug 42 fills the bore B in the tapered bore portion $B_T$. Irrespective of the spring 40 biasing the piston 30 in a closed relationship within the sealing ring 22, the presence of the eutectic plug 42 prevents any outward movement of the piston until such plug is removed. The eutectic material is chosen such that it will melt out of the bore $B_T$ at a temperature below the safe temperature limit for the wheel/tire assembly. Such materials are known and used by those knowledgeable in this art and it will suffice to say that the eutectic plug will melt out and clear the bore $B_T$ upon the wheel temperature reaching the required upper temperature limit set for the eutectic material.

Figure 2:
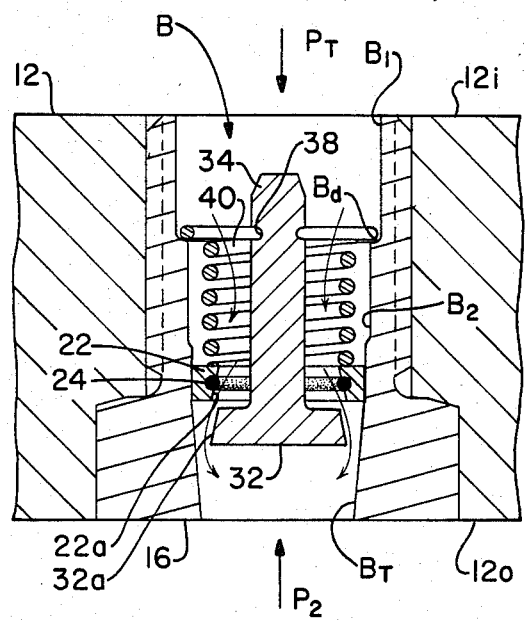
FIG. 2 is a sectional elevational view similar to FIG. 1 but showing the device in its overpressure venting position.

In operation, the valve plug assembly is shown in FIG. 1 in its normal temperature and pressure operational condition. In this condition, the piston 30 is seated in a pressure sealing relationship within the ring 22 and the eutectic material 42 is retained in the housing by reason of the tapered bore $B_T$. FIG. 2 illustrates the condition wherein the wheel temperature has increased sufficiently to melt out the eutectic plug 42. Upon such increase in temperature, the pressure in the tire will naturally also increase and this is indicated by $P_T$. $P_T$ is the overpressure condition within the tire due to the increased temperature and it is of such magnitude as to overcome the spring 40 and force the piston 30 out of its sealing position within the ring 22. Because of the absence of the eutectic plug the piston 30 is able to move outwardly which effects venting of the overpressure to the atmosphere. The amount of venting is governed by the diameter of the bore 22a of the ring 22 and the extend of piston travel indicated by letter "d" in the drawing.

Figure 3:
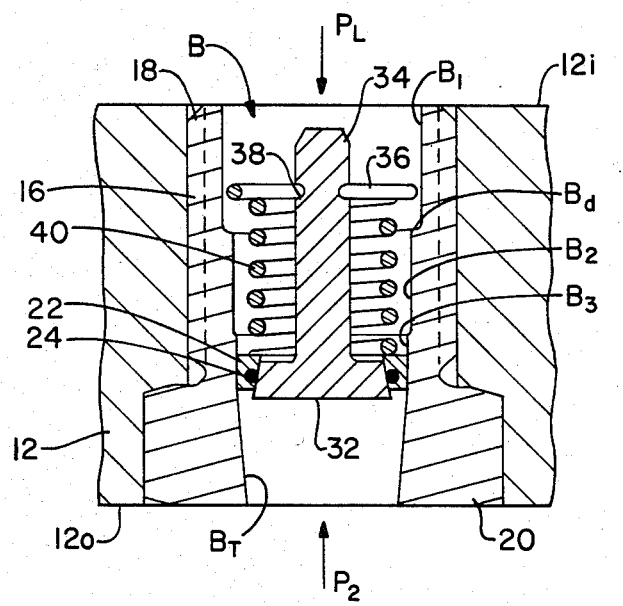
FIG. 3 is a sectional elevational view similar to FIG. 2 but showing the device in its closed valve position to maintain a minimum safe tire pressure for continued tire operation.

Now therefore, and referring to FIG. 3, when the overpressure is vented to such an extent that the pressure within the tire drops below that which is required to overcome the spring 40, as indicated by $P_L$, the piston is drawn back by the spring bias into its sealing relationship within the seal ring 22. This effectively cuts off venting at the predetermined pressure $P_L$ such that the tire beads will remain intact against the wheel flanges and the tire may continue to function as a load-bearing member of the landing gear assembly.

While specific elements and details have been shown for the purpose of illustrating the invention, it will be apparent to those skilled in this art that various changes and modifications may be made therein without departing from the spirit or scope of the invention.

What is claimed is:

1. A safety device for mounting within an aircraft wheel to vent a tire of overpressure within the wheel/tire assembly generated by heat during high energy braking comprising in combination:
    a cylindrical housing received within the wheel defining an axial bore which extends from the outside to the inside of the wheel/tire assembly;
    a eutectic material plug coaxially mounted within and filling the bore toward the outside end thereof and adapted to melt at a predetermined temperature of the wheel; and
    valve means coaxially mounted and completely contained within the bore toward the inside end thereof, said valve biased in a position to close off the bore under normal tire pressure and also maintained in the closed position by the presence of the eutectic plug within the bore;
    said eutectic plug being melted out of the housing bore when the wheel temperature reaches a predetermined high limit to allow operation of the valve means wherein the valve means is opened by overpressure within the tire which overcomes the bias to vent the overpressure axially through the bore to the outside, said valve means being returned to the closed position when the tire pressure drops to a value insufficient to overcome the bias on the valve means.

2. The safety device as set forth in claim 1 wherein the housing bore has a tapered portion toward the outside end that retains the eutectic material within the bore and the valve means comprises:
    an annular sealing ring fixedly positioned within the bore inwardly from the eutectic plug;
    a piston hving a head end that engages the annular ring in a sealing relationship and a stem that passes inwardly through the ring; and
    a spring mounted about the piston stem and captured between the annular ring and means mounted on the end of the stem to normally bias the piston in a closed relationship with the ring.

3. The safety device as set forth in claim 2 wherein the ring has a tapered bore and the piston has a tapered peripheral edge about the head end that is complimentary to the tapered ring bore so as to effect a seal between the two.

4. The safety device as set forth in claim 3 wherein an O-ring is mounted in a groove in the tapered bore of the ring to effect a seal with the piston.

5. The safety device as set forth in claim 2 wherein the housing bore is characterized by a first bore portion toward the inside that is of a slightly larger diameter than an intermediate bore portion and a washer is mounted on the end of the piston stem that captures the spring between it and the annular ring, said washer having a diameter less than the diameter of the first bore portion but greater than the diameter of the intermediate bore portion to thus limit the extent of movement of the piston when in an open position.

* * * * *